US005921910A

United States Patent [19]

Schmid et al.

[11] Patent Number: 5,921,910

[45] **Date of Patent: *Jul. 13, 1999**

[54] POLYGLYCOL ETHER MIXTURES AS FOAM INHIBITORS

[75] Inventors: Karl-Heinz Schmid, Mettmann; Gilbert Schenker, Erkrath, both of Germany

[73] Assignee: Henkel Kommanditgesellschaft auf Aktien, Duesseldorf, Germany

[ * ] Notice: This patent is subject to a terminal disclaimer.

[21] Appl. No.: 07/835,913

[22] PCT Filed: Aug. 21, 1990

[86] PCT No.: PCT/EP90/01380

§ 371 Date: Feb. 26, 1992

§ 102(e) Date: Feb. 26, 1992

[87] PCT Pub. No.: WO91/03537

PCT Pub. Date: Mar. 21, 1991

[30] Foreign Application Priority Data

Aug. 30, 1989 [DE] Germany ............................ 39 28 604

[51] Int. Cl.[6] ............................... B01D 19/04; C11D 7/08

[52] U.S. Cl. .......................... 516/134; 510/219; 510/436; 510/467; 510/469

[58] Field of Search .................................... 252/321, 358, 252/174.21, 559, 538, 540, 557; 510/467, 219, 436, 469, 477, 480; 516/134

[56] References Cited

U.S. PATENT DOCUMENTS

| | | | |
|---|---|---|---|
| 3,558,716 | 1/1971 | Engelhardt et al. | 568/905 |
| 3,862,994 | 1/1975 | Yates | 568/905 OR |
| 4,011,273 | 3/1977 | Abend et al. | 252/461 X |
| 4,421,666 | 12/1983 | Hempel et al. | 252/321 X |
| 4,495,092 | 1/1985 | Schmid et al. | 252/174.21 |
| 4,548,729 | 10/1985 | Schmid et al. | 252/174.21 |
| 4,590,237 | 5/1986 | Wuhrmann et al. | 554/480 OR |
| 4,954,283 | 9/1990 | Schmid et al. | 252/174.21 |
| 5,205,959 | 4/1993 | Schmid et al. | 252/174.21 |

FOREIGN PATENT DOCUMENTS

| | | |
|---|---|---|
| 0124815 | 11/1984 | European Pat. Off. . |
| 0303928 | 2/1989 | European Pat. Off. . |
| 0326795 | 8/1989 | European Pat. Off. . |
| 1944569 | 2/1978 | Germany . |
| 3315951 | 11/1984 | Germany . |
| 3800493 | 7/1989 | Germany . |

*Primary Examiner*—Richard D. Lovering
*Assistant Examiner*—Daniel S. Metzmaier
*Attorney, Agent, or Firm*—Ernest G. Szoke; Wayne C. Jaeschke; Real J. Grandmaison

[57] ABSTRACT

A process for suppressing the foaming properties of a cleaning product by adding to the cleaning product a foam-suppressing additive consisting of polyethylene glycol ethers corresponding to formula I $$R_1O—(CH_2CH_2O)_n—R_2 \quad (I)$$

wherein $R_1$ is a long-chain branched alkyl or alkenyl radical, $R_2$ is an alkyl radical containing 4 to 8 carbon atoms and n is a number from 4 to 9, and wherein the radical $R_1O$ is derived from an alcohol mixture consisting of at least 45 mol percent of an equimolar isomer mixture of 2-hexyl-1-dodecanol and 2-octyl-1-decanol and 0 to 55 mol percent of 2-hexyl-1-decanol.

11 Claims, No Drawings

POLYGLYCOL ETHER MIXTURES AS FOAM INHIBITORS

This application is filed under 35 U.S C. §371 and is based on PCT/EP90/0138, filed Aug. 21, 1990.

BACKGROUND OF THE INVENTION

1. Field of the Invention

This invention relates to the use of selected mixtures of end-capped polyethylene glycol ethers as foam-suppressing additives in low-foaming cleaning products. The invention seeks to provide auxiliaries of the type mentioned which combine high effectiveness with physiological harmlessness and biological degradability. In addition, the invention addresses the problem of, on the one hand, enabling the performance profile of the auxiliaries used in practical application to be optimized and, on the other hand, providing selected polyethylene glycol ethers of the type mentioned which ensure improved formulatability of these auxiliaries in marketable concentrate form. The second of these two aspects is of considerable practical significance as will be appreciated from the following:

Low-foaming cleaning products for institutional and industrial use, particularly for cleaning metal, glass and ceramic surfaces, generally contain foam-suppressing additives which are capable of counteracting unwanted foaming. The foam-suppressing auxiliaries generally have to be used because the soil particles detached from the substrates and collecting in the cleaning baths act as foam generators. However, the cleaning products themselves may contain constituents which give rise to unwanted foaming under the particular working conditions. One example of such constituents are the widely used anionic surfactants.

It is also known that, in industrial cleaning, aqueous acid concentrates and, in particular, corresponding concentrates of aqueous phosphoric acid play an important part as a component of the mixture as a whole. It is desirable in this regard to be able to offer the foam-suppressing additives in admixture with the concentrates. However, reliable and uniform dosing presupposes homogeneous miscibility of the foam-inhibiting components with the aqueous acid concentrates within the temperature range of importance in practice, for example from 0 to 50° C. Separation processes lead to unacceptable phase separation in the active-substance concentrate and thus make it difficult or even impossible to dose the active-substance mixture, particularly in large-scale use. The problem addressed by the present invention is inter alia to provide systems which make improved technical handling possible, particularly in regard to the last of the aspects discussed above.

2. Discussion of Related Art

One class of highly effective and, at the same time, biologically degradable foam inhibitors is described in DE-OS 33 15 951 which relates to the use of end-capped polyethylene glycol ethers corresponding to formula (I) $R_1O—(CH_2CH_2O)_n—R_2$, in which $R_1$ is a linear or branched alkyl or alkenyl radical containing 8 to 18 carbon atoms, $R_2$ is an alkyl radical containing 4 to 8 carbon atoms and n is an integer of 7 to 12. A product of this type, wherein $R_1$ is a $C_{12-18}$ fatty alcohol radical, $R_2$ is the n-butyl radical and n is the number 10, has proved to be particularly successful in practice.

By slightly modifying the structure of the fatty alcohol polyethylene glycol ethers mentioned, it is possible in particular to provide for improved operation at relatively low temperatures, for example of the order of room temperature or only slightly elevated temperatures. DE-OS 38 00 493 relates to the use of polyethylene glycol ethers corresponding to general formula (I) above, in which $R_1$ is a linear or branched alkyl or alkenyl radical containing 20 to 28 carbon atoms, $R_2$ is an alkyl radical containing 4 to 8 carbon atoms and n is a number of 6 to 20. In this case, the crucial modification lies in the use of relatively long-chain radicals $R_1$. These end-capped polyglycol ethers are also distinguished by high stability to acids and alkalis. Their foam-inhibiting effect in alkaline and neutral cleaning liquors is enhanced in the described sense, in addition to which they satisfy legal requirements in regard to biodegradability.

The use of adducts of alkylene oxides with organic compounds containing reactive hydrogen atoms in the molecule as foam-suppressing additives has been known for some time. Those which have been described in the literature include, in particular, adducts of propylene oxide with aliphatic polyalcohols (see, for example, DE-PSS 1 280 455 and 1 621 592) and with aliphatic polyamines (see, for example, DE-PS 1 289 597 and 1 621 593) and also adducts of ethylene oxide and propylene oxide with aliphatic polyamines, more particularly ethylenediamine (see DE-PS 1 944 569). However, compounds of this type are not sufficiently biodegradable to satisfy present legal requirements.

DESCRIPTION OF THE INVENTION

The teaching of the present invention is based on the observation that the above-stated problem of optimizing, on the one hand, the performance profile and, on the other hand, the formulatability of the above-mentioned polyethylene glycol ethers corresponding to general formula (I) in marketable concentrate form can be solved when selected mixtures of polyethylene glycol ethers corresponding to general formula (I) are used.

Accordingly, the present invention relates to the use of selected polyethylene glycol ether mixtures corresponding to general formula (I)

$$R_1O—(CH_2CH_2O)_n—R_2 \qquad (I)$$

in which $R_1$ is a long-chain branched alkyl and/or alkenyl radical, $R_2$ is an alkyl radical containing 4 to 8 carbon atoms and n is a number of at least 4, as foam-suppressing additives for low-foaming cleaning products. The teaching according to the invention is characterized in that mixtures of polyethylene glycol ethers in which the function $R_1O—$ is derived from the following alcohol mixtures (a) or (b)

a) 10 to 100 mol-% of an equimolar isomer mixture of 2-hexyl-1-dodecanol and 2-octyl-1-decanol 0 to 90 mol-% 2-hexyl-1-decanol 0 to 50 mol-% 2-octyl-1-dodecanol or b) 40 to 70 mol-% 2-hexyl-1-decanol 60 to 30 mol-% 2-octyl-1-dodecanol, are used. In the mixtures of general formula (I) used in accordance with the invention, n is always a number of 5 to 9.

Among the end-capped polyethylene glycol ether mixtures corresponding to definition (a), it is preferred in accordance with the invention to use those in which the functions $R_1O—$ are derived from alcohol mixtures having the following composition: at least 45 mol-% of the isomer mixture of 2-hexyl-1-dodecanol and 2-octyl-1-decanol, 0 to 55 mol-% 2-hexyl-1-decanol and no more than 30 mol-% 2-octyl dodecanol.

In the "fine-tuning" of the various practical requirements which foam-suppressing additives of the type in question have to satisfy, it was found that mixtures of the type defined in accordance with the invention with the emphasis of the C chain length in the function $R_1O$— from the general formula in the range from about 16 to 18 carbon atoms are particularly valuable when branched alkanols of the Guerbet alcohol type form the basic substance. It is known that alcohols of this type are formed by condensation of fatty alcohols containing a relatively small number of carbon atoms in the presence of alkali, for example potassium hydroxide or potassium alcoholate. The reaction takes place, for example, at temperatures of 200 to 300° C. and leads to branched Guerbet alcohols which have the branching in the 2-position to the hydroxyl group. In one particularly preferred embodiment, the invention seeks to use predominantly or, preferably, exclusively linear fatty alcohols for the production of the 2-branched Guerbet alcohols and, ultimately, for the synthesis of the compounds corresponding to general formula (I). Fatty alcohols of natural origin are known to have at least predominantly even-numbered chain lengths so that it is not possible by dimerization thereof to obtain the 2-branched Guerbet alcohol containing 18 carbon atoms as a uniform condensation product of only one selected fatty alcohol. The necessary dimerization of a mixture of the two fatty alcohols containing 8 and 10 carbon atoms leads to an isomer mixture of the $C_{18}$ Guerbet alcohol of 2-hexyl-1-dodecanol and 2-octyl-1-decanol. In addition, the self-condensation products of the two alcohols used are formed, i.e. 2-hexyl-1-decanol from the octanol used and 2-octyl-1-dodecanol from the decanol used.

Mixtures of this type and the type described in accordance with the invention are suitable for solving the problem addressed by the invention. Alternative (b) according to the invention, which is free from $C_{18}$ Guerbet alcohols, but provides for suitable mixing ratios of the Guerbet alcohols containing 16 carbon atoms on the one hand and 20 carbon atoms on the other hand, also produces the required result.

The end-capped fatty alcohol polyglycol ethers corresponding to formula (I) are produced in accordance with DE-OS 33 15 951. Thus, the above-described fatty alcohols containing a relatively large number of carbon atoms are best reacted with ethylene oxide in a molar ratio of 1:5 to 1:9 and the hydroxyl groups present in the reaction product obtained are subsequently etherified. The reaction with ethylene oxide takes place under the known alkoxylation conditions, preferably in the presence of suitable alkaline catalysts. Etherification of the free hydroxyl groups is preferably carried out under the known conditions of Williamson's ether synthesis using linear or branched $C_{4-8}$ alkyl halides. According to the invention, particular significance is attributed to the n-butyl radical for the substituent $R_2$ in general formula (I). Accordingly, examples of this concluding etherification step are n-butyl halides, such as n-butyl chloride, although the invention is by no means limited thereto. Further examples are amyl halides, hexyl halides and higher alkyl halides within the above-mentioned range.

It can be useful to use the alkyl halide and the alkali in a stoichiometric excess, for example of 10 to 50%, over the hydroxyl groups to be etherified. The cleaning products in which the end-capped polyglycol ether mixtures according to the invention are used may contain the constituents typically present in such products, such as wetting agents, builders and complexing agents, alkalis or acids, corrosion inhibitors and, optionally, organic solvents. Suitable wetting agents are nonionic surface-active compounds of the polyglycol ether type, which are obtained by addition of ethylene oxide onto alcohols, particularly fatty alcohols, alkyl phenols, fatty amines and carboxylic acid amides, and anionic wetting agents, such as alkali metal, amine and alkylolamine salts of fatty acids, alkylsulfuric acids, alkylsulfonic acids and alkyl benzenesulfonic acids. The builders and complexing agents present in the cleaning products may be, above all, alkali metal orthophosphates, polymer phosphates, silicates, borates, carbonates, polyacrylates and gluconates and also citric acid, nitrilotriacetic acid, ethylenediamine tetraacetic acid, 1-hydroxyalkane-1,1-diphosphonic acids and ethylenediamine tetra-(methylenephosphonic acid), phosphonoalkane polycarboxylic acids, for example phosphonobutane tricarboxylic acid, and alkali metal salts of these acids. Highly alkaline detergents, particularly bottle washing detergents, contain considerable quantities of caustic alkali in the form of sodium and/or potassium hydroxide. Where particular cleaning effects are required, the cleaning products may contain organic solvents, for example alcohols, petroleum fractions and chlorinated hydrocarbons and also free alkylolamines.

It is particularly important that the mixtures of general formula (I) according to the invention are used in connection with the formulation of temperature-stable, single-phase aqueous acid concentrates of the type used in practice as a constituent of cleaning agent systems. Thus, aqueous phosphoric acid concentrates containing substantially equal parts of phosphoric acid and water may be mixed with the mixtures of general formula (I) according to the invention to form concentrates which are single-phase at temperatures of 0 to 50° C. and, hence, are particularly suitable for simple practical handling. The combination of this property with the wide-scale application of mixtures of the type in question as foam-suppressing additives both at relatively low temperatures (20° C.) and at elevated temperatures (65° C.) is a valuable addition to the technical possibilities of the particular field in question.

The end-capped polyglycol ether mixtures to be used in accordance with the invention produce valuable effects even in low concentrations. They are preferably added to the cleaning products in such quantities that their concentration in the ready-to-use solutions is in the range from about 50 to 500 ppm.

EXAMPLES

In the following Examples, the foam-inhibiting effect of the additives selected in accordance with the invention is determined by the test described in the following by comparison with structurally similar additives which do not fall within the scope of the invention:

Testing of the foam-inhibiting effect is carried out under the following conditions:

In a double-walled 2 liter measuring cylinder, 300 ml of a 1% by weight aqueous sodium hydroxide solution are heated to 20° C. and 65° C. 0.1 ml of the foam-inhibiting surfactant to be tested is added to the solution. Using a peristaltic pump, the liquid is pumped around at a circulation rate of 4 1/minute. The test liquor is taken in approx. 5 mm above the bottom of the measuring cylinder by means of a 55 cm long glass tube (internal diameter 8.5 mm, external diameter 11 mm), which is connected to the pump by a 1.6 m long silicone hose (internal diameter 8 mm, external diameter 12 mm), and is returned by free fall through a second glass tube (length 20 cm) arranged at the 2,000 ml mark of the measuring cylinder.

A 1% by weight aqueous solution of the triethanolamine salt of tetrapropylene benzenesulfonate is used as the test foam generator. It is added to the circulated liquor in quantities of 1 ml at intervals of 1 minute. The total volume of foam and liquid formed is determined. The foam-inhibiting effect of the particular surfactant material used is better the longer it takes the total volume of liquid and foam phase to reach the 2,000 ml mark of the measuring cylinder. In the following Examples, the corresponding figures for this time are expressed in minutes and in ml test foam generator.

Product A (invention)

| | |
|---|---|
| $R_1OH$ | 28% 2-octyl-1-dodecanol<br>25% 2-hexyl-1-dodecanol<br>25% 2-octyl-1-decanol<br>22% 2-hexyl-1-decanol |

for the production of $R_1O—(CH_2CH_2O)_7$-n-butyl ether

Product B (comparison)

$R_2OH$=2-hexyl-1-decanol for the production of $R_2O—(CH_2CH_2O)_6$-n-butyl ether Product C (comparison)

Coconut oil alcohol-10EO-n-butyl ether

| ml Test foam | Product A | | Product B | | Product C | |
|---|---|---|---|---|---|---|
| generator | 20° C. | 65° C. | 20° C. | 65° C. | 20° C. | 65° C. |
| 0 | 300 | 300 | 320 | 300 | 400 | 300 |
| 1 | 300 | 300 | 320 | 300 | 460 | 320 |
| 2 | 300 | 300 | 340 | 300 | 580 | 340 |
| 3 | 300 | 300 | 380 | 300 | 680 | 360 |
| 4 | 340 | 300 | 440 | 300 | 800 | 400 |
| 5 | 380 | 300 | 460 | 320 | 1000 | 420 |
| 6 | 400 | 320 | 480 | 420 | 1400 | 400 |
| 7 | 420 | 400 | 520 | 460 | 1600 | 460 |
| 8 | 420 | 460 | 540 | 520 | 1820 | 540 |
| 9 | 460 | 520 | 600 | 600 | 2000 | 780 |
| 10 | 480 | 620 | 700 | 660 | | 940 |
| 11 | 500 | 760 | 840 | 760 | | 1240 |
| 12 | 540 | 860 | 1100 | 820 | | 1760 |
| 13 | 580 | 1000 | 1280 | 1100 | | 1880 |
| 14 | 600 | 1100 | 1500 | 1180 | | 1940 |
| 15 | 660 | 1220 | 1700 | 1240 | | 2000 |
| 16 | 720 | 1480 | 1880 | 1320 | | |
| 17 | 800 | 1620 | 2000 | 1480 | | |
| 18 | 1000 | 1760 | | 1660 | | |
| 19 | 1300 | 1860 | | 1820 | | |
| 20 | 1680 | 2000 | | 2000 | | |
| 21 | 2000 | | | | | |

Formulatability test

Formulation 1 (invention)

40% phosphoric acid (85%)

20% product A

1% Araphen G2D (a product of Henkel KGaA) $C_{12-14}$ alkyl epoxide, ring-opened with diethanolamine 39% water This formulation is single-phase in the temperature range from 0 to 50° C. and does not show any separation.

Formulation 2 (comparison)

40% phosphoric acid (85%)

20% product B

1% Araphen G2D (a product of Henkel KGaA) $C_{12-14}$ alkyl epoxide, ring-opened with diethanolamine 39% water The formulation separates into two phases above 30° C. and, accordingly, is of no practical use.

Formulation 3 (comparison)

40% phosphoric acid (85%)

20% product C

1% Araphen G2D (a product of Henkel KGaA) $C_{12-14}$ alkyl epoxide, ring-opened with diethanolamine 39% water This formulation is single-phase in the temperature range from 0 to 50° C. and does not show any separation.

Result

Only product A has an excellent foam-inhibiting effect (compared with product C) at 20° C. and 65° C. and can be formulated (by comparison with product B) into a temperature-stable formulation (concentrate).

We claim:

1. The process of suppressing the foaming properties of a cleaning product, comprising adding to said cleaning product a foam-suppressing additive consisting of polyethylene glycol ethers corresponding to formula I $$R_1O—(CH_2CH_2O)_n—R_2 \quad (I)$$

wherein $R_1$ is a long-chain branched alkyl or alkenyl radical, $R_2$ is an alkyl radical containing 4 to 8 carbon atoms and n is a number from 4 to 9, and wherein the radical $R_1O$ is derived from an alcohol mixture consisting of at least 45 mol percent of an equimolar isomer mixture of 2-hexyl-1-dodecanol and 2-octyl-1-decanol, 0 to 55 mol percent of 2-hexyl-1-decanol, and less than 30 mol percent of 2-octyl-1-dodecanol.

2. The process as in claim 1 wherein said cleaning product comprises an aqueous concentrate containing an acid.

3. The process as in claim 2 wherein said acid comprises phosphoric acid.

4. The process as in claim 1 wherein said foam-suppressing additive is present in an amount sufficient to provide from about 50 ppm to about 500 ppm of said additive in a dilute solution of said concentrate.

5. The process of preparing a temperature-stable, single-phase aqueous acid cleaning concentrate, comprising adding to said cleaner concentrate a foam-suppressing additive consistig of polyethylene glycol ethers corresponding to formula I $$R_1O—(CH_2CH_2O)_n—R_2 \quad (I)$$

wherein $R_1$ is a long-chain branched alkyl or alkenyl radical, $R_2$ is an alkyl radical containing 4 to 8 carbon atoms and n is a number from 4 to 9, and wherein the radical $R_1O$ is derived from an alcohol mixture consisting of at least 45 mol percent of an equimolar isomer mixture of 2-hexyl-1-dodecanol and 2-octyl-1-decanol, 0 to 55 mol percent of 2-hexyl-1-decanol, and less than 30 mol percent of 2-octyl-1-dodecanol.

6. The process as in claim 5 wherein said acid comprises phosphoric acid.

7. The process as in claim 5 wherein said foam-suppressing additive is present in an amount sufficient to provide from about 50 ppm to about 500 ppm of said additive in a dilute solution of said concentrate.

8. A temperature-stable, single-phase aqueous cleaner concentrate containing a foam-suppressing additive, said additive consisting of polyethlene glycol ethers corresponding to formula I $$R_1O—(CH_2CH_2O)_n—R_2 \quad (I)$$

wherein $R_1$ is a long-chain branched alkyl or alkenyl radical, $R_2$ is an alkyl radical containing 4 to 8 carbon atoms and n is a number from 4 to 9, and wherein the radical $R_1O$ is derived from an alcohol mixture consisting of at least 45 mol percent of an equimolar isomer mixture of 2-hexyl-1-dodecanol and 2-octyl-1-decanol, 0 to 55 mol percent of 2-hexyl-1-decanol, and less than 30 mol percent of 2-octyl-1-dodecanol.

9. A cleaner concentrate as in claim 8 containing an acid.

10. A cleaner concentrate as in claim 9 wherein said acid comprises phosphoric acid.

11. A cleaner concentrate as in claim 8 wherein said foam-suppressing additive is present in an amount sufficient to provide from about 50 ppm to about 500 ppm of said additive in a dilute solution of said concentrate.

* * * * *